No. 624,205. Patented May 2, 1899.
W. H. GAILOR.
CARRIAGE AXLE.
(Application filed Dec. 27, 1898.)
(No Model.)
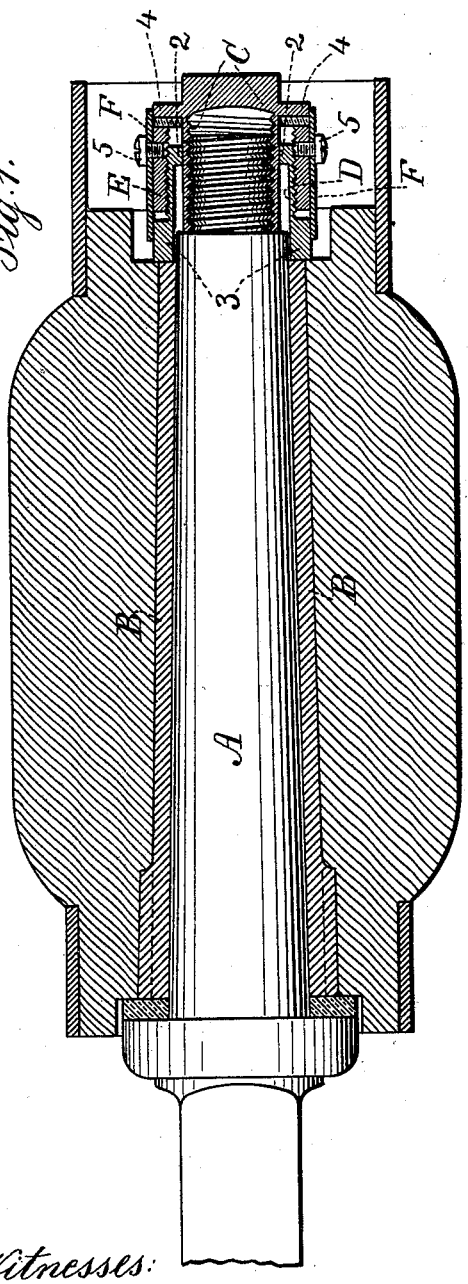
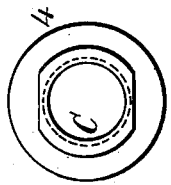
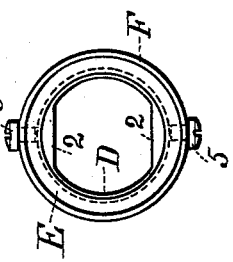
Witnesses:
J. Staib
Chas H Smith
Inventor:
William H. Gailor
per L. W. Serrell & Son
attys

UNITED STATES PATENT OFFICE.

WILLIAM H. GAILOR, OF SARATOGA SPRINGS, NEW YORK.

CARRIAGE-AXLE.

SPECIFICATION forming part of Letters Patent No. 624,205, dated May 2, 1899.

Application filed December 27, 1898. Serial No. 700,368. (No model.)

*To all whom it may concern:*

Be it known that I, WILLIAM H. GAILOR, a citizen of the United States, residing at Saratoga Springs, in the county of Saratoga and State of New York, have invented an Improvement in Carriage-Axles, of which the following is a specification.

In carriage-axles it is usual to provide leather washers between the back collar of the axle and the back end of the hub-tube and also between the flange of the nut and the front end of the hub-tube; but these leather washers are rapidly worn and the hub becomes loose upon the axle, and in cases where the leather washers are too thick the nut cannot be screwed up to the shoulder on the axle without binding the hub tightly upon the axle.

The object of the present invention is to provide an adjustment that can be set up to prevent endwise looseness of the hub-tube upon the axle whether leather washers are made use of or not, and this adjustment can be made without loosening the nut that is screwed upon the end of the axle.

The aforesaid object I accomplish by a washer-sleeve that surrounds the outer end of the axle and can be moved endwise of the axle and is guided by the flattened sides of the cylindrical portion of the nut, and this washer-sleeve is set up from time to time by a nut-sleeve that surrounds it and is turned by a cylindrical case, and it acts between the flange of the nut and the washer-sleeve to move the same endwise of the axle to any desired point, and in consequence of the washer-sleeve being held from rotating by the nut that is firmly screwed upon the axle there is no more tendency for the parts to become loose than for an ordinary carriage-nut to become loose, and the cylindrical sleeve serves to exclude dirt, dust, and foreign substances from between the flange of the washer-sleeve and the end of the nut-sleeve, and this can be turned by the fingers applied to the outside of the cylindrical case or in any other convenient manner.

In the drawings, Figure 1 is a longitudinal section of the axle and the parts connected therewith. Fig. 2 is a separate rear view of the nut, and Fig. 3 shows the washer-sleeve, nut-sleeve, and cylindrical case endwise.

The axle A is to be of any desired character, and the tube B is inserted into the hub, as usual, and the axle is provided with a screw upon the end that receives the nut $c$, and this nut is to be screwed up tightly with its inner end against the shoulder of the axle. The present improvement is available with the axle of any vehicle. The sides of the tubular portion of the nut C are flattened, and the washer-sleeve D is made with an end flange 3, adapted to set against the end of the axle-tube B, and this washer-sleeve is screw-threaded on the exterior surface, and upon the interior surface are flattened portions or lugs 2, that fit the flattened sides of the nut C, so that this washer-sleeve can be moved endwise of the axle; but it cannot turn except when the nut C is turned.

Around the screw-threaded portion of the washer-sleeve D is a nut-sleeve E, the outer end of which rests against the flange 4 of the nut C, and around this nut-sleeve is a cylindrical case F, that is preferably of comparatively thin sheet metal and extends to the flange 3, or nearly so, and the screws 5, passing through the cylindrical case F and into the nut-sleeve E, hold the case and nut-sleeve firmly together and allow for the case F being used for rotating the nut-sleeve E.

It will be understood that when the parts are put together the washer-sleeve D is to be drawn toward the flange 4 of the nut C by rotating the nut-sleeve E in the proper direction, and then the nut C is to be screwed upon the end of the axle A tightly, as usual. If desired, washers of leather or other material may intervene between the end flange 3 of the washer-sleeve and the end of the hub-tube and also between the back collar of the axle and the rear end of the hub-tube, or this leather washer may be dispensed with, and the cylindrical case F is rotated, and with it the nut-sleeve E, until the end flange 3 of the washer-sleeve is set up against the end of the hub-tube, or nearly so, in order that the looseness of the hub-tube upon the axle may be prevented, and the rotation of the hub and its tube upon the axle and against the end flange of the washer-sleeve will not tend to change the adjustment of the parts, because the washer-sleeve cannot revolve in consequence of being upon the flattened portion of the nut C; but the washer-sleeve can be moved endwise, as required, from time to time to prevent looseness by the nut-sleeve E and cylindrical casing F being revolved together.

It will be understood that in consequence of the parts being connected to the nut they will all be removed by unscrewing the nut from the axle for lubricating such axle or otherwise, and when the nut is replaced upon the axle the adjustment can be effected, as hereinbefore described.

I claim as my invention—

The combination with the axle having a screw-threaded end and a nut to be screwed firmly upon such screw-threaded end and having exterior flat surfaces, of a washer-sleeve surrounding the nut and adapted to slide upon the flattened surfaces thereof and having an exterior screw-threaded surface and a nut-sleeve fitting the screw-thread upon the washer-sleeve and acting against the flange of the nut for moving the washer-sleeve endwise of the axle to compensate wear or looseness of the hub-tube endwise upon the axle, and a cylindrical case surrounding the nut-sleeve and connected therewith and at one end surrounding the circular end of the nut and covering at the other end the opening between the washer-sleeve and the nut-sleeve and by which case the nut-sleeve can be rotated, substantially as set forth.

Signed by me this 15th day of December, 1898.

WILLIAM H. GAILOR.

Witnesses:
H. G. CUMMINGS,
CLARENCE B. KILMER.